United States Patent Office 3,330,153
Patented July 11, 1967

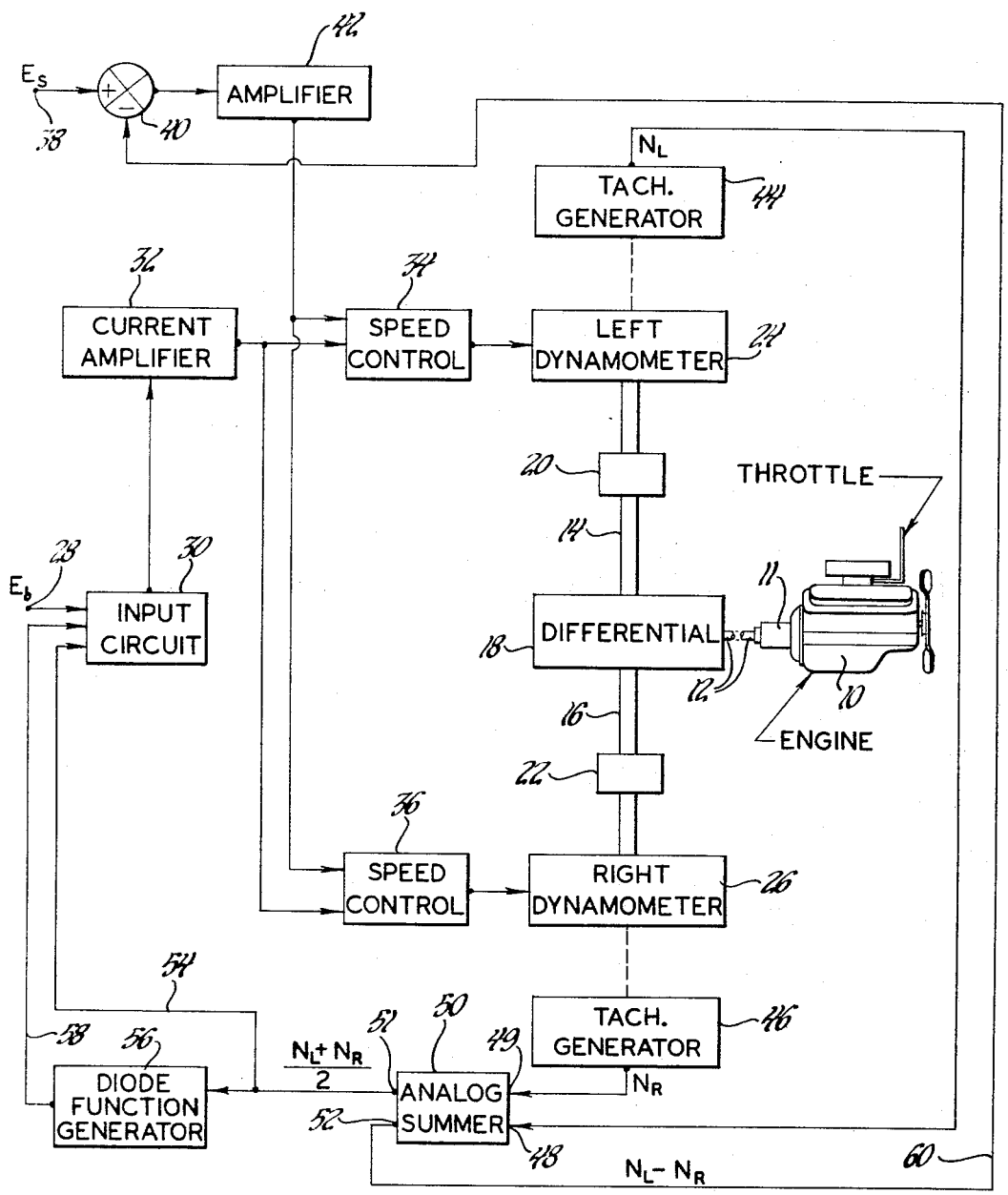

3,330,153
INDIVIDUAL WHEEL SPEED CONTROL DYNAMOMETER
Frank Perna, Jr., Detroit, Mich., assignor to General Motors Corporation, Detroit, Mich., a corporation of Delaware
Filed Feb. 23, 1965, Ser. No. 434,219
6 Claims. (Cl. 73—116)

ABSTRACT OF THE DISCLOSURE

Dynamometer apparatus for testing vehicle drive trains including differential and half-axles. Separate braking devices are connected to respective half-axles and individually controlled through feedback circuitry to introduce a left-right wheel speed difference signal simulating a vehicle turn.

Summary of the invention

This invention relates to apparatus for testing the performance of vehicle drive train components under simulated road conditions and more particularly to the simulation of a turning condition in a vehicle having right and left rotary drive wheel components.

In evaluating the design and quality of vehicle drive train components, it is always desirable and often absolutely necessary to conduct carefully monitored tests of the components as they operate in concert with the rest of the assembled drive train. These tests generally require that the components be operated for long periods of time under conditions which compare with the conditions to which the components are subjected during actual use. It has become an accepted and, in fact, preferred practice to perform these precise and lengthy test procedures at least partly in the laboratory under closely controlled conditions. This is accomplished through the use of prerecorded data which is applied to the vehicle components under test through various transducers which reconstruct the actual road conditions as recorded in analog or digital form on a recording medium. In this manner an actual road test may be performed in the test laboratory and duplicated over and over without the error introduced through human control of variables.

In accordance with the present invention, the operation of vehicle drive train components may be evaluated in the laboratory under controlled conditions which simulate a turning effect such as would be caused by rounding a corner in an actual road test vehicle. In general this is accomplished by driving right and left drive wheel components at a predetermined speed, loading, through appropriate dynamometer means, the right and left drive components with a base load to simulate the actual road effects which oppose the forward motion of the vehicle, and complementally varying the right and left drive component loads to produce a speed differential such as that encountered by the drive wheels of a vehicle in which such wheels are differentially connected to a motive power source.

In a particular embodiment of the invention, the loads on the right and left drive wheel components may be applied through respective dynamic brakes which are individually controllable to accomplish the complementary load variations. In addition, the speed differential and base loads may be produced in response to prerecorded input signals obtained, for example, during an actual road test.

In accordance with the present invention, actual road load conditions may be automatically created and imposed on the components under test to simulate various effects such as changes in grade, etc. This may be accomplished by means of a feedback control circuit including a function generator for automatically producing nonlinear feedback signals to be compared with a base input signal to generate an error or control signal. A better understanding of the invention may be obtained from a reading of the following specification which describes a specific embodiment of the invention. This specification is to be taken with the accompanying figure which is a block diagram of the specific embodiment.

Referring specifically to the figure, the vehicle drive train to be placed under test through the present invention includes an internal combustion engine 10 having suitable throttle means and connected through an automatic transmission 11 to rotate a drive shaft 12 at a speed or set of speeds corresponding to predetermined conditions. The output or drive shaft 12 is mechanically connected to drive a pair of half axles 14 and 16 through a standard differential unit 18. As shown in the figure it may be desirable to include in the components under test the left and right wheel brake units 20 and 22, respectively. Under normal circumstances the actual wheels and tires of the vehicle may be omitted from the test apparatus. Similarly, where the components specifically under investigation are primarily the differential unit 18 and the half axles 14 and 16, the drive shaft 12 may be driven by any motive power source other than the internal combustion engine 10; for example, an electric motor could be substituted.

Through suitable means, the left wheel drive assembly is mechanically connected to a left dynamometer unit 24, and the right wheel drive assembly is mechanically connected to a right dynamometer unit 26. The dynamometer units 24 and 26 are individually controllable units adapted to impose forces upon the drive wheel assembly thereby the simulate the various frictional and intertial forces to which a vehicle drive assembly is subjected during an actual road test. Under certain circumstances it may be desirable to employ dynamometer units having the capacity to both deliver and receive power. Under other circumstances it may only be necessary to employ dynamometer units which are capable of applying braking loads. In the latter instance various types of eddy current brakes may be used including, as a particular example, the Dynamatic Model 2025 which is produced by the Dynamic Corporation of Kenosha, Wisconsin.

As previously mentioned a preferred practice is to control the dynamometer units employed in a road test simulation with electrical signals which are prerecorded during an actual road test. These signals may be recorded on a multi-channel tape recorder carried in the test vehicle and connected to various vehicle parts through suitable transducer means. Either analog or digital signals may be employed; however, in the present instance it shall be assumed that analog voltages representing the rotary speeds of various vehicle components are used. Accordingly, a base speed signal in the form of a varying voltage $E_b$ may be applied to an input terminal 28 to represent a base speed at which the left and right drive components, including half axles 14 and 16, are to be rotated. This signal may be synchronized with a throttle position signal to set the speed of engine 10. This base speed signal applied to input terminal 28 is connected into an input circuit 30 which functions as a summing device in connection with feedback circuits to be later described. The output of the input circuit 30 is connected through a current amplifier 32 which functions to amplify the base speed signal to a usable level. Current amplifier 32 is connected through a first vernier speed control circuit 34 to the left dynamometer unit 24 and through a second speed control unit 36 to the right dynamometer unit 26. Assuming that the characteristics of the right and left dynamometer units 24 and 26 are substantially the same, it can be seen that by simultaneous application of the control signal from amplifier 32 to the right and left dynamometer units, the left and right half axles 14 and 16 will be equally loaded and will therefore rotate at approximately the same speed.

To simulate the effect of rounding a turn in the road, a prerecorded slip speed voltage $E_s$ representing the difference in speeds of the left and right wheels during a turn may be applied to a second input terminal 38. This signal is applied to the positive input of a comparator 40 and thence through an amplifier 42 to the left and right speed control units 34 and 36, respectively. The speed control units 34 and 36 are responsive to the slip speed signal to complementally vary the load imposed on the left and right wheel drive assemblies by the left and right dynamometer units 24 and 26, respectively. For simplification purposes it may be assumed that when rounding a turn one of the drive wheels slows down by the same amount that the other drive wheel speeds up. Accordingly, to simulate a right turn the speed control unit 34 may be responsive to the signal from amplifier 42 to lighten the load imposed upon half axle 14 by the left dynamometer unit 24. Conversely, speed control unit 36 is responsive to the signal from amplifier 42 to increase the load imposed upon half axle 16 by the right dynamometer unit 26.

Where the right and left dynamometer units are eddy current brakes, the speed control units 34 and 36 may take the form of variable attenuators. The attenuators may include servo controls responsive to the amplified signal from 42 to complementally vary the attenuator settings to increase the attenuation provided by one unit by the same amount as the attenuation provided by the other unit is decreased.

To continuously monitor the performance of the system, left and right tachometer generators 44 and 46, respectively, may be mechanically connected to the dynamometer units 24 and 26 to produce DC voltages which are proportional to the speeds of rotation of the half axles and the attached dynamometer rotor units. Tachometer generator 44 may produce a voltage representing the speed of the left dynamometer unit which is identified in the figure as $N_L$. Similarly, the tachometer generator 46 produces a voltage proportional to the speed of the right dynamometer unit which is identified in the figure as $N_R$. The signal $N_L$ from tachometer generator 44 is connected to a first input 48 of an analog summing circuit 50, and the signal $N_R$ from the tachometer generator 46 is connected to a second input 49 of summer 50. The analog summer 50 is responsive to the input voltages at 48 and 49 to produce a first output voltage on output 51 which, as shown in the figure, corresponds to the average of the speeds of the right and left wheel drive assemblies. This may be accomplished by the combination of an operational amplifier having the proper gain characteristic and an inverter. The analog summer unit 50 also produces a second output voltage on output 52 which represents the difference in speed of the left and right wheel drive assemblies. This also may be accomplished by a suitable combination of an operational amplifier and inverter as will be apparent to those skilled in the art. The average speed signal appearing on output 51 is connected through a linear feedback path 54 to the input circuit 30 where it is combined with the base speed signal from terminal 28. The average speed signal from output 51 is also connected through a function generator 56 which provides a nonlinear feedback signal conveyed through path 58 to the input circuit 30 for combination with the base speed signal appearing on input terminal 28.

The function generator 56 may comprise a combination of diodes which are variably biased in accordance with a predetermined speed-torque characteristic to automatically simulate actual road load conditions, that is, the forces which tend to oppose the forward motion of a vehicle during an actual road test. The linear, nonlinear and base speed signals may be combined in the input circuit 30 to produce an error signal which then becomes the control signal applied through current amplifier 32 and speed controls 34 and 36 to the left and right dynamometer units 24 and 26. Accordingly, this system may be made to operate in accordance with actual speed torque conditions encountered by a test vehicle on the road.

The difference speed signal which appears on output 52 of the analog summer 50 is conducted through path 60 to the negative input of the comparator 40 as indicated. This speed difference signal is compared at 40 with the slip speed signal $E_s$ to produce an error signal which is applied through amplifier 42 to the speed control units 34 and 36. Through this feedback circuit it is assured that the left and right dynamometer units 24 and 26 faithfully reproduce the turning effect which is represented by the slip speed signal $E_s$.

From the foregoing description it can be seen that the present invention provides for the simulation of actual road conditions to a higher degree of accuracy than has heretofore been the case. Although the invention has been described with respect to a specific embodiment, it is to be understood that it is not limited to the embodiment described. For a definition of the invention reference should be had to the appended claims.

I claim:

1. Vehicle test apparatus for simulating actual road speed and load conditions in the operation of the right and left wheel drive components of a vehicle drive train comprising first and second individually controllable braking dynamometers mechanically connectable to the right and left wheel drive components, first input means connected to the first and second dynamometers for applying a base braking load signal equally to the dynamometers, first and second regulatable control means connected intermediate the first input means and the first and second dynamometers for varying over a predetermined range the effect of the load signal on the dynamometers, and second input means operatively connected to the first and second control means and responsive to a differential speed signal to oppositely regulate the first and second control means thereby to complementally vary the effects of the base load signal for simulating a turning condition of a vehicle carrying said right and left wheel drive components.

2. In combination with test apparatus for monitoring the performance of a vehicle drive train including motive power means and right and left wheel drive components differentially connected to the motive power means and driven thereby, first and second electric brakes adapted to be mechanically connected to the right and left wheel drive components, respectively, for applying braking loads thereto, first input means connected to the first and second electric brakes and responsive to a first prerecorded input signal to substantially equally energize the first and second brakes to apply a base load to the drive components, and second input means connected to the first and second electric brakes and responsive to a second prerecorded input signal to complementally vary the energization of the first and second electric brakes thereby to stimulate a turning condition of the vehicle.

3. Apparatus as defined in claim 2 including means to produce a voltage corresponding to the average of the speeds of the right and left wheel drive components, a function generator having an input, an output and a transfer function corresponding to predetermined speed-torque characteristics, the input being connected to receive said voltage, and means for modifying said first input signal in accordance with the output of the function generator.

4. In combination with test apparatus for monitoring the performance of a vehicle drive train including motive power means and right and left wheel drive components differentially connected to the motive power means and driven thereby, first and second electric brakes adapted to be mechanically connected to the right and left wheel drive components, respectively, for applying braking loads thereto, first input means connected to the first and second electric brakes and responsive to a first input signal to equally energize the first and second brakes to apply a base load to the drive components, first and second tachometer generators connected to the right and left drive components, respectively, for producing electrical signals corresponding to the speeds of rotation thereof, means for receiving the electrical signals and for producing a speed difference signal, second input means connected to the first and second electric brakes and responsive to a second input signal to complementally vary the energization of the first and second electric brakes thereby to simulate a turning condition of the vehicle, the second input means including comparison means connected to receive the speed difference signal for comparison with the second input signal for providing feedback control of the simulated turning condition.

5. In combination with test apparatus for monitoring the performance of a vehicle drive train including motive power means and right and left wheel drive components differentially connected to the motive power means and driven thereby, first and second brakes adapted to be mechanically connected to the right and left wheel drive components, respectively, for applying braking loads thereto, first input means connected to the first and second electric brakes and responsive to a first electrical input signal to equally energize the first and second brakes to apply a base load to the drive components, first and second selectively variable attenuator means connected intermediate the first input means and the first and second electric brakes, respectively, for individually varying the energization of said brakes, and second input means operatively connected to the first and second attenuator means for complementally varying the degree of attenuation provided by the attenuator means in response to a second input signal thereby to simulate a turning condition of the right and left drive components.

6. Apparatus as defined in claim 5 further including feedback control means comprising right and left tachometer generators actuated by the right and left wheel drive components, respectively, for producing voltages related to the speeds of rotation of the drive components, means connected to receive the voltages for producing a voltage representing the difference therebetween, comparison means for comparing the voltage with the second input signal to produce an error signal, and means for complementally varying the attenuators in accordance with the error signal.

References Cited
UNITED STATES PATENTS

| | | | |
|---|---|---|---|
| 2,130,833 | 9/1938 | Bennett | 73—123 X |
| 2,130,900 | 9/1938 | Presbrey | 73—117 |
| 3,050,994 | 10/1962 | Heigl et al. | 73—118 X |

RICHARD C. QUEISSER, *Primary Examiner.*

J. W. MYRACLE, *Assistant Examiner.*